United States Patent
Taki et al.

(10) Patent No.: US 7,521,126 B2
(45) Date of Patent: Apr. 21, 2009

(54) READILY BONDABLE POLYESTER FILM OPTICAL USE AND LAMINATED POLYESTER FILM FOR OPTICAL USE

(75) Inventors: Hiroshi Taki, Ohtsu (JP); Chikao Morishige, Ohtsu (JP); Harunobu Kuroiwa, Tokyo (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/568,746

(22) PCT Filed: Aug. 20, 2004

(86) PCT No.: PCT/JP2004/012325

§ 371 (c)(1),
(2), (4) Date: Feb. 21, 2006

(87) PCT Pub. No.: WO2005/019316

PCT Pub. Date: Mar. 3, 2005

(65) Prior Publication Data
US 2006/0227439 A1    Oct. 12, 2006

(30) Foreign Application Priority Data
Aug. 21, 2003    (JP) .............................. 2003-297445

(51) Int. Cl.
B32B 27/06    (2006.01)
B32B 27/08    (2006.01)
B32B 27/18    (2006.01)
B32B 27/36    (2006.01)

(52) U.S. Cl. .................. 428/480; 428/910; 524/174; 524/175; 524/176; 528/293; 528/294; 528/295

(58) Field of Classification Search .................. None
See application file for complete search history.

(56) References Cited

U.S. PATENT DOCUMENTS

| 4,004,062 A | * | 1/1977 | Peterson ..................... 428/383 |
| 4,004,063 A | * | 1/1977 | Peterson et al. .............. 428/383 |
| 4,590,117 A | * | 5/1986 | Taniguchi et al. ............ 428/212 |
| 5,369,211 A | * | 11/1994 | George et al. ................ 528/293 |
| 5,413,840 A | * | 5/1995 | Mizuno ..................... 428/195.1 |
| 5,424,120 A | * | 6/1995 | Culbertson ................... 428/336 |
| 5,492,589 A | * | 2/1996 | Mizuno ....................... 156/280 |
| 5,527,594 A | * | 6/1996 | Kinoshita et al. ............ 428/212 |
| 5,662,988 A | * | 9/1997 | Nakayama et al. ............ 428/212 |
| 5,932,320 A | * | 8/1999 | Okajima et al. ............ 428/195.1 |
| 6,303,210 B1 | * | 10/2001 | Watanabe et al. ............ 428/141 |
| 6,482,501 B2 | * | 11/2002 | Mizuno et al. ............... 428/141 |
| 6,525,165 B1 | * | 2/2003 | Tsukamoto et al. .......... 528/308 |
| 6,921,580 B2 | * | 7/2005 | Akatsu et al. ................ 428/480 |
| 6,926,945 B2 | * | 8/2005 | Yano et al. ................... 428/141 |
| 7,005,176 B2 | * | 2/2006 | Tojo et al. .................... 428/141 |
| 7,022,388 B2 | * | 4/2006 | Hashimoto et al. .......... 428/34.9 |
| 2006/0257760 A1 | * | 11/2006 | Mori et al. ....................... 430/7 |

FOREIGN PATENT DOCUMENTS

| JP | 47-096056 A | * | 6/1982 |
| JP | 57-096056 | * | 6/1982 |
| JP | 39-062662 A | * | 4/1984 |
| JP | 59-062662 | * | 4/1984 |
| JP | 63-267550 | * | 11/1988 |
| JP | 7-151902 | | 6/1995 |
| JP | 2001-071439 | | 3/2001 |
| JP | 2001-096696 | | 4/2001 |
| JP | 2002-210906 | | 7/2002 |
| JP | 2002-241527 | | 8/2002 |
| KR | 2001-0037483 | * | 5/2001 |
| KR | 2001037483 A | * | 7/2001 |

OTHER PUBLICATIONS

Schimtz, Peter et al., "Films." Ullman's Encyclopedia of Industrial Chemistry, 5th Ed., vol. A11 (1988), pp. 85-95, 105-06, 108-110.*

* cited by examiner

*Primary Examiner*—Vivian Chen
(74) *Attorney, Agent, or Firm*—Morrison & Foerster LLP

(57) ABSTRACT

A readily-adhesive polyester film for optical applications that suppresses rainbow reflections under fluorescent lamps and has excellent adhesion to a hard coating layer and exhibits excellent adhesion at high temperatures and high humidities (resistance to humidity and heat) includes a biaxially-stretched polyester film and a coating layer that is stacked on at least one side of the polyester film and produced by applying to at least one side of the polyester film an aqueous coating liquid containing a resin composition including (A) an aqueous polyester resin and (B) at least one compound that is a water-soluble titanium chelate compound, a water-soluble titanium acylate compound, a water-soluble zirconium chelate compound or a water-soluble zirconium acylate compound as main components. The mixing ratio (A)/(B) is from 10/90 to 95/5 by weight. After that the coating is dried and then stretched in at least one direction.

15 Claims, No Drawings

READILY BONDABLE POLYESTER FILM OPTICAL USE AND LAMINATED POLYESTER FILM FOR OPTICAL USE

FIELD OF THE INVENTION

The invention relates to a readily-adhesive polyester film for optical applications that is useful as a base material for antireflection films which are attached to the front side of a display screen of a tough panel, a liquid crystal display (LCD), a cathode-ray-tube (CRT) for a television set or computer, a plasma display (PDP), or the like to impart antireflection properties such that the reflection of external light, glare, rainbow reflections, and the like can be suppressed. The invention also relates to a laminated polyester film for optical applications that includes the above film and a hard coating layer stacked on a coating layer on at least one side of the above film.

BACKGROUND OF THE INVENTION

The front side of a display of a touch panel, a computer, a television set, a liquid crystal display, or the like or the front side of a decoration or the like is provided with a hard-coated film that includes a base material of a transparent plastic film and a hard coating layer that is stacked on the base material and made from an electron beam-, ultraviolet light- or heat-curable resin. The base material of the transparent plastic film is generally a transparent biaxially-oriented polyester film, and in many cases, a readily-adhesive layer is provided as an intermediate layer to improve the adhesion between the base material of the polyester film and the hard coating layer.

The hard-coated film is required to have durability to temperature, humidity and light, and to have transparency, chemical resistance, scratch resistance, anti-fouling properties, and the like. The hard-coated film, which is used for displays, decorations or the like, is also required to have excellent visibility and a certain design feature. For this purpose, a certain antireflection layer with a multilayer structure of alternately stacked high and low refractive index layers is generally formed on the upper layer of the hard coating layer in order to suppress glare, rainbow reflections or the like caused by reflected light viewed from any angle.

In applications such as displays and decorations, however, there has recently been a demand for larger screens (larger areas) and higher grades, which is particularly accompanied by an increase in the requirement level for suppression of rainbow reflections (interference fringes) especially under fluorescent lamps. Since most fluorescent lamps are of three-wavelength type for reproduction of daylight color, interference fringes can easily occur. There is also an increasing demand for cost reduction by simplifying the antireflection layer. Thus, it has been demanded that interference fringes be reduced as much as possible only by means of the hard-coated film.

It is believed that in the hard-coated film, rainbow reflections (interference fringes) can be caused by a large difference between the refractive indexes of a base material of a polyester film (for example, 1.62 for PET) and a hard coating layer (for example, 1.49 for acrylic resin).

For the purpose of prevention of interference fringes by a reduction in the refractive index difference, for example, JP H07-151902(A) discloses a method in which the refractive index of a hard coating layer is raised by adding metal oxide fine particles to the hard coating layer. The addition of metal oxide fine particles to the hard coating layer, however, leads to a decrease in the essential function of the hard coating layer, such as transparency, chemical resistance, scratch resistance, anti-fouling properties, or the like. When an antireflection layer is further formed on such a hard coating layer, the antireflection layer needs to be optimized depending on the change in the refractive index of the hard coating layer.

JP 2001-71439(A) discloses another method for suppressing the interference fringes in the hard coating layer, which focuses on local variations in the thickness of a film and includes the steps of producing a readily-adhesive film followed by calendering the film to reduce the local variations in the thickness of the film. In this method, however, the film alone is evaluated for interference fringes, and no examination is conducted regarding interference fringes based on the difference in refractive index at the interface formed by stacking the hard coating layer. This method also has an increased number of processes and thus has a problem with productivity.

JP 2002-241527(A) discloses an invention that focuses on unevenness in the thickness of the layers forming a hard-coated film and defines an interference fringe area ratio. However, the specification of this application includes no specific description on the degree of the unevenness in thickness or how to reduce the unevenness in thickness. In order to reduce the unevenness in the thickness of each layer, for example, the thickness of each layer should be strictly controlled so that there should be a problem with productivity or yield.

In addition, JP 2002-210906(A) discloses a method that focuses on the backside reflectance of a film itself and includes the steps of controlling the backside reflectance to a low level and stacking a hard coating with a specific hardness. The method disclosed in this publication, however, essentially includes the steps of forming a coating layer with a specific refractive index and a specific thickness on the side opposite to the hard coating layer of the hard-coated film and controlling the backside reflectance to 0.1% or less. Thus, even the backside must be designed when the film is designed. In addition, the backside reflectance should be controlled to be always 0.1% or less in the film manufacturing process by measuring the backside reflectance and optionally by changing the conditions in cases where the backside reflectance is out of the range, and such control of the backside reflectance complicates the process.

SUMMARY OF THE INVENTION

It is an object of the invention to provide a readily-adhesive polyester film for optical applications that suppresses rainbow reflections under fluorescent lamps and has excellent adhesion to a hard coating layer and exhibits excellent adhesion at high temperatures and high humidities (resistance to humidity and heat) and to provide a laminated polyester film for optical applications that includes the above film and a specific hard coating layer stacked on the film.

The inventors have focused on the refractive index of the readily-adhesive layer and controlled the refractive index of the readily-adhesive layer by selecting the type and content of the resin and additive components for the readily-adhesive layer in such a manner that the refractive index differences between the polyester film base and the readily-adhesive layer and between the readily-adhesive layer and the hard coating layer can be reduced, respectively, and thus have found that rainbow reflections can be suppressed under fluorescent lamps while the adhesion to the hard coating layer and the adhesion at high temperatures and high humidities (resistance to humidity and heat) can be maintained.

Thus, the invention is directed to a readily-adhesive polyester film for optical applications that includes a biaxially-stretched polyester film; and a coating layer that is stacked on at least one side of the polyester film and produced by a process including: applying, to at least one side of the polyester film, an aqueous coating liquid containing a resin composition including (A) an aqueous polyester resin and (B) at least one of a water-soluble titanium chelate compound, a water-soluble titanium acylate compound, a water-soluble zirconium chelate compound, or a water-soluble zirconium acylate compound, as main components, wherein the mixing ratio (A)/(B) is from 10/90 to 95/5 by weight; drying the coating; and then stretching the coating in at least one direction. The invention is also directed to a laminated polyester film for optical applications that includes: the above readily-adhesive polyester film; and a hard coating layer that is stacked on the coating layer on at least one side of the readily-adhesive polyester film and includes an electron beam-cured or ultraviolet light-cured acrylic resin or a heat-cured siloxane resin.

When a hard coating layer is laminated on the readily-adhesive layer of the optical readily-adhesive polyester film of the invention, the film of the invention demonstrates excellent antireflective properties to suppress the reflection of external light, glare, rainbow reflections, and the like and exhibits excellent adhesion to the hard coating layer and exhibits excellent adhesion at high temperatures and high humidities (resistance to humidity and heat).

Thus, the film of the invention is useful as a base material film for antireflection films which are attached to the front side of a display screen of a tough panel, a liquid crystal display (LCD), a cathode-ray-tube (CRT) for a television set or computer, a plasma display (PDP), a decoration, or the like to impart antireflection properties such that the reflection of external light, glare, rainbow reflections, and the like can be suppressed. Additionally, the film of the invention exhibits excellent adhesion between the readily-adhesive layer and the layer placed thereon and exhibits excellent adhesion at high temperatures and high humidities (resistance to humidity and heat). Thus, the layer placed on the readily-adhesive layer may be not only the hard coating layer for optical applications but also any other layer comprising any of a wide variety of materials, such as a photosensitive layer, a diazo sensitized layer, a mat layer, an ink layer, an adhesive layer, a thermoset resin layer, a UV cure resin layer, a vapor-deposited layer of metal or inorganic oxide.

DETAILED DESCRIPTION OF THE INVENTION

Base Film

In the invention, the biaxially-stretched polyester film for use as a base material comprises a polyester resin and may be mainly composed of at least one of polyethylene terephthalate, polypropylene terephthalate, polybutylene terephthalate, and polyethylene naphthalate. Among these polyester resins, polyethylene terephthalate is most preferred in terms of the balance between the physical properties and cost. When biaxially stretched, polyester films can have improved resistance to chemicals or heat, improved mechanical strength or the like.

The biaxially-stretched polyester film may be of a monolayer or multilayer type. In each layer, if necessary, the polyester resin may contain any of a variety of additives. Examples of such additives include antioxidants, light-resisting agents, antigelling agents, organic lubricants, antistatic agents, ultraviolet absorbing agents, and surfactants.

In order to improve the handling properties of films such as sliding properties, winding properties and anti-blocking properties or improve wearing properties such as wear-resistant properties and anti-scratch properties, inert particles are generally added to polyester film base materials. However, the film of the invention is for use as a base film for optical components and thus required to have excellent handling properties while maintaining high transparency. More specifically, with respect to the transparency, the readily-adhesive polyester film for use as an optical component preferably has a total light transmittance of at least 85%, particularly preferably of at least 90%. The higher the total light transmittance, the better the transparency (100% is ideal). As the total light transmittance increases, however, the handling properties can decrease such that industrial-scale production could be difficult. Thus, the total light transmittance preferably has an upper limit of 96%.

Therefore, the content of the inert particles in the base film should preferably be as low as possible. For this purpose, it is preferred that the film should have a multilayer structure in which only the outer layer contains the particles or that the film should be substantially free of particles while only the coating layer contains fine particles.

Particularly, with respect to transparency, if the polyester film is substantially free of inert particles, it should be important to improve the handling properties of the film by adding inorganic and/or heat-resistant polymer particles to the aqueous coating liquid and forming irregularities on the surface of the coating layer. As used herein, the phrase "substantially free of inert particles" means that for example, in reference to inorganic particles, the content of the particles is less than the detection limit when the element(s) derived from the particles is quantitatively analyzed by fluorescent X-ray analysis.

In the readily-adhesive Polyester film of the invention, the coating layer is made from a resin composition that includes (A) an aqueous polyester resin and (B) at least one of a water-soluble titanium chelate compound, a water-soluble titanium acylate compound, a water-soluble zirconium chelate compound, or a water-soluble zirconium acylate compound, as main components, wherein the mixing ratio (A)/(B) is from 10/90 to 95/5 by weight.

When heated in the process of stretching the base film, the resin composition produces a uniform film by the crosslinking reaction of (B) at least one of the titanium chelate compound, the titanium acylate compound, the zirconium chelate compound, or the zirconium acylate compound with the polyester resin. Namely, the metal chelate or acylate compound is decomposed by the heat treatment. In the coating layer, therefore, the metal chelate or acylate compound is not present in the state at the time when it is added to the coating liquid.

Thus, the content of the metal chelate or acylate compound in the coating liquid may be calculated from the content of the metallic element (Ti or Zr) in the coating layer after the heat treatment as follows.

(1) First, the type of the chelate or acylate that has been added to the coating liquid is identified by the residue of the chelate or acylate in the coating layer.

(2) The content of the metal chelate or acylate compound in the coating liquid is then calculated from the content of the metallic element (Ti or Zr) in the coating layer.

The refractive index of the coating layer can be made higher than that of the polyester resin (A) alone by increasing the composition ratio of (B) at least one of the titanium chelate compound, the titanium acylate compound, the zirconium chelate compound, or the zirconium acylate compound.

The refractive index of the coating layer can also be increased by the addition of the metal fine particles. However, if the metal fine particles are added, the stretchability of the coating layer and the adhesion between the hard coating layer and the base film can be reduced.

In the polyester resin (A) for use in the invention, an active site such as a hydroxyl group or a carboxyl group may be introduced into its molecular chain. Even though such an active site is not introduced, the ester bond site can cause a reversible reaction at high temperatures so that a crosslinking reaction can occur at any site to produce a dense film.

In order that acrylic resins should have similar crosslinkability, a certain crosslinkable functional group must be introduced. Since the refractive index of acrylic resins themselves is relatively low, however, it would be difficult to control the refractive index to the same level as that of the coating layer according to the invention, even if the titanium chelate compound, the titanium acylate compound, the zirconium chelate compound, or the zirconium acylate compound is used together.

In addition, the polyester resin (A), a component of the coating layer, is involved in the adhesion to the base polyester film. Thus, if the composition ratio of (A) the aqueous polyester resin to (B) the compound (A/B) is less than 10/90, the adhesion to the base film would be reduced, and the stretchability of the coating layer would also be reduced so that the coating layer cannot be uniform in the stretching process. This can cause a reduction in the transparency necessary for optical applications and a problem with the adhesion to the hard coating layer to be formed on the readily-adhesive layer. If the composition ratio of (A) the aqueous polyester resin to (B) the compound (A/B) is more than 95/5, the crosslinking with (B) the water-soluble titanium acylate compound, the water-soluble zirconium chelate compound or the water-soluble zirconium acylate compound would be poor, and the refractive index would be reduced. This can reduce the adhesion at high temperatures and high humidities (the resistance to humidity and heat) and make the rainbow reflection-suppressing effect under fluorescent lamps insufficient.

In the invention, the aqueous polyester resin (A) refers to any polyester resin capable of being dissolved or dispersed in water or any water-soluble organic solvent (such as an aqueous solution containing less than 50% by weight of an alcohol, alkylcellosolve, ketone or ether solvent). In order to impart the aqueous properties to any polyester resin, it is important to introduce a hydrophilic group such as a hydroxyl group, a carboxyl group, a sulfonate group, a phosphate group, and an ether group into the molecular chain of the polyester resin. Among these hydrophilic groups, the sulfonate group is preferred in view of coating film properties and adhesion.

In a case where the sulfonate group is introduced into polyester, the sulfonic acid compound is more preferably from 1 to 10% by mole based on the total amount of all the acid components of the polyester. If the amount of the sulfonate group is less than 1% by mole, the polyester resin would not exhibit the aqueous properties, and it can have reduced compatibility with (B) at least one of the water-soluble titanium chelate compound, the water-soluble titanium acylate compound, the water-soluble zirconium chelate compound, or the water-soluble zirconium acylate compound, so that it can be difficult to obtain a uniform and transparent coating layer. If the amount of the sulfonate group is more than 10% by mole, the adhesion at high temperatures and high humidities (resistance to humidity and heat) can tend to be degraded.

The aqueous polyester resin (A) preferably has a glass transition temperature of at least 40° C. For this purpose, an aromatic acid such as terephthalic acid, isophthalic acid, and naphthalenedicarboxylic acid is preferably used as the main acid component of the polyester resin (A). The glycol component is preferably a glycol with a relatively small number of carbon atoms, such as ethylene glycol, propane glycol, 1,4-butanediol, and neopentylglycol, or an aromatic glycol such as an ethylene oxide adduct of bisphenol A. In addition, the materials for the polyester resin (A) may include a rigid component such as biphenyl or a dicarboxylic acid or diol component having a high refractive index atom such as bromine and sulfur, as long as the physical properties of the film are not degraded. If the glass transition temperature of the polyester resin (A) is less than 40° C., the adhesion at high temperatures and high humidities (resistance to humidity and heat) can tend to be insufficient, and the refractive index of the polyester resin (A) can be reduced so that the coating layer can also have a reduced refractive index. As a result, rainbow reflections can tend to be insufficiently suppressed under fluorescent lamps.

Another main component for the coating layer is (B) at least one of a water-soluble titanium chelate compound, a water-soluble titanium acylate compound, a water-soluble zirconium chelate compound, or a water-soluble zirconium acylate compound. The term "water-soluble" means that the compound can be dissolved in water or an aqueous solution containing less than 50% by weight of a water-soluble organic solvent.

Examples of the water-soluble titanium chelate compound include diisopropoxybis(acetylacetonato)titanium, isopropoxy(2-ethyl-1,3-hexanediolato)titanium, diisopropoxybis(triethanolaminato)titanium, di-n-butoxybis(triethanolaminato)titanium, hydroxybis(lactato)titanium, ammonium salt of hydroxybis(lactato)titanium, and titanium peroxycitric acid ammonium.

Examples of the water-soluble titanium acylate compound include oxotitaniumbis(monoammonium oxalate) and the like. Examples of the water-soluble zirconium compound include zirconium tetraacetylacetonate and zirconium acetate.

In combination with the above main component, the coating layer may also include any resin other than the above, such as an acrylic resin, a polyurethane resin, a polyester resin, an alkyd resin, and a vinyl resin such as polyvinyl alcohol, as long as the advantageous effect of the invention is not affected. Any crosslinking agent may also be used together, as long as the advantageous effect of the invention is not affected. Examples of the crosslinking agent for use include adducts of formaldehyde with urea, melamine, benzoguanamine, or the like; amino resins such as alkyl ether compounds produced from any of these adducts and an alcohol of 1 to 6 carbon atoms; polyfunctional epoxy compounds; polyfunctional isocyanate compounds; blocked isocyanate compounds; polyfunctional aziridine compounds; and oxazoline compounds.

In the invention, the coating liquid for use in forming the coating layer is a aqueous coating liquid mainly composed of (A) the aqueous polyester resin, (B) at least one of the water-soluble titanium chelate compound, the water-soluble titanium acylate compound, the water-soluble zirconium chelate compound, or the water-soluble zirconium acylate compound, and an water-soluble solvent. For the application of the aqueous coating liquid to the surface of the polyester film, an appropriate amount of any known anionic or nonionic surfactant is preferably added to the coating liquid such that the wettability to the film can be improved for uniform application of the coating liquid.

In order to impart handling properties, antistatic properties, antibiotic properties, or any other functionality to the film, the aqueous coating liquid may also contain an additive such as inorganic and/or heat-resistant polymer particles, an antistatic agent, an ultraviolet absorbing agent, an organic lubricant, an antimicrobe agent, and a photo-oxidation catalyst.

Besides water, the solvent for use in the coating liquid may contain an alcohol such as ethanol, isopropyl alcohol, and benzyl alcohol, in an amount of less than 50% by weight, based on the total amount. Any organic solvent other than alcohols may also be included in an amount of less than 10% by weight, as long as it can be dissolved. However, the total amount of the alcohols and the other organic solvents should preferably be less than 50% by weight.

According to the invention, the laminated polyester film for optical applications can be produced by forming a hard coating layer on the coating layer on at least one side of the readily-adhesive polyester film, wherein the hard coating layer is made from an electron beam-curable or ultraviolet light-curable acrylic resin or a heat-curable (thermosetting) siloxane resin.

The electron beam-curable or ultraviolet light-curable resin has an acrylate type functional group and for example, may include a relatively low molecular weight polyester resin, polyether resin, acrylic resin, epoxy resin, urethane resin, alkyd resin, spiroacetal rein, polybutadien resin, or polythiol-polyene resin, or an oligomer or prepolymer of (meth)acrylate or the like of a polyfunctional compound such as a polyhydric alcohol, and a reactive diluent of a monofunctional monomer such as ethyl (meth)acrylate, ethyl hexyl (meth)acrylate, styrene, methylstyrene, and N-vinylpyrrolidone, or a polyfunctional monomer such as trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylte, and neopentyl glycol di(meth)acrylate.

The ultraviolet light-curable resin may be used in combination with a photopolymerization initiator such as acetophenones, benzophenones, Michler's benzoylbenzoate, α-amyloxime ester, tetramethylthiuram monosulfide, and thioxanthones, or a photosensitizer such as n-butylamine, triethylamine, and tri-n-butyl phosphine.

Preparation of the Readily-Adhesive Polyester Film

A method for producing the readily-adhesive polyester film of the invention will be described with reference to an example using polyethylene terephthalate (hereinafter abbreviated as PET), but it will be understood that such a description is not intended to limit the invention.

A PET resin is sufficiently dried under vacuum and then supplied to an extruder. The PET resin is melted and extruded through a T die at about 280° C. into a sheet and fed to a rotary cooling roll. The sheet is allowed to cool and solidified by static electricity impression method so that an unstretched PET sheet is obtained. The unstretched PET sheet may have a monolayer structure or a multilayer structure produced by coextrusion method. In a preferred mode, the PET resin is substantially free of inert particles.

The resulting unstretched PET sheet is stretched 2.5 to 5.0 times in the longitudinal direction with a roll heated to a temperature of 80 to 120° C. so that a uniaxially-stretched PET film is obtained. The film is then held at its end with a clip and introduced into a hot air zone heated to a temperature of 70 to 140° C. and stretched 2.5 to 5.0 times in the width direction. The film is subsequently introduced into a heat-treatment zone controlled to temperature of 160 to 240° C. and heat-treated for 1 to 60 seconds result to complete crystalline orientation.

In this film production process, the aqueous coating liquid is applied to at least one side of the PET film at any stage. The coating layer may be formed on both sides of the PET film. The concentration of the resin composition solids in the aqueous coating liquid is preferably from 2 to 35% by weight, particularly preferably from 4 to 15% by weight.

Any known method may be used to apply the aqueous coating liquid to the PET film, for example, including reverse roll coating, gravure coating, kiss coating, die coater method, roll brush method, spray coating, air knife coating, wire-bar coating, pipe doctor method, impregnation coating, and curtain coating. These methods may be used either singly or in combination for the application.

In the invention, it is important to form the coating layer by a process including the steps of applying the aqueous coating liquid to the unstretched or uniaxially-stretched PET film, drying the coating and then stretching the coating in at least one direction and then performing heat treatment to the coating. The film coated with the coating liquid is introduced into a tenter and heated for lateral stretching and heat treatment. In this process, the chelate or acylate compound can form a stable crosslinked coating layer by a thermal crosslinking reaction. In contrast, when the coating liquid is applied to a biaxially-stretched PET film and dried to form a coating layer, the quantity of heat has to be suppressed enough to reduce the heat-treatment-induced degradation of the transparency of the base film or to reduce the heat-treatment-induced variation in the physical properties, so that the amount of heat for the thermal crosslinking reaction can be too short to form a uniform crosslinked coating layer.

In the invention, the final resulting coating layer preferably has a coating amount of 0.02 to 0.5 $g/m^2$. If the coating amount of the coating layer is less than 0.02 $g/m^2$, there can be little effect on the adhesion, and the rainbow reflection-suppressing effect under fluorescent lamps can also be insufficient. If the coating amount is more than 0.5 $g/m^2$, the rainbow reflection-suppressing effect under fluorescent lamps can also tend to be insufficient.

The coating layer of the readily-adhesive polyester film produced according to the invention not only has excellent adhesion to the hard coating layer made from an electron beam-curable or ultraviolet light-curable acrylic resin or a thermosetting siloxane resin but also can exhibit excellent adhesive strength to coatings for applications other than optical applications. Examples of such coatings include photosensitive layers, diazo sensitized layers, mat layers, magnetic layers, inkjet ink-receiving layers, hard coating layers, UV cure layers, thermoset resins, printer's ink, UV ink, adhesives for dry lamination, extrusion lamination or the like, thin film layers formed by vacuum deposition, electron beam deposition, sputtering, ion plating, CVD, or the like of metal, inorganic materials or any oxides thereof, and organic barrier layers formed by plasma polymerization.

Production of Laminated Polyester Film for Optical Applications

A method for producing the laminated polyester film for optical applications according to the invention will be described with reference to an example using a PET film, but it will be understood that such a description is not intended to limit the invention.

A hard-coating-layer-forming coating liquid containing the electron beam-curable or ultraviolet light-curable acrylic resin or the thermosetting siloxane resin is applied to the coating layer on at least one side of the readily-adhesive polyester film. The coating liquid should not always be diluted but may be diluted with an organic solvent depending on the viscosity or wettability of the coating liquid, or the thickness of the coating layer, or the like. The hard coating layer is formed by a process including the steps of applying the hard-coating-layer-forming coating liquid onto the coating layer on at least one side of the readily-adhesive polyester film, then optionally drying the coating, and applying an electron beam or ultraviolet light to the curable resin or heating the curable resin, depending on the curing conditions, to cure the coating.

In the invention, the hard coating layer preferably has a thickness of 1 to 15 μm. A hard coating layer with a thickness of less than 1 μm can have little effect with respect to chemical resistance, scratch resistance, anti-fouling, or the like. A hard coating layer with a thickness of more than 15 μm can have reduced flexibility and an increased risk of cracking or the like.

The optical laminated polyester film obtained according to the invention can find wide applications and may be particularly formed into a excellent antireflection film by further forming an antireflection layer on the hard coating layer. Such an antireflection layer may be made of a monolayer or multi-layers of an inorganic material(s) such as a high refractive index material, e.g. $ZnO$, $TiO_2$, $CeO_2$, $SnO_2$, and $ZrO_2$, and a low refractive index material, e.g. $MgF_2$ and $SiO_2$ or a metal material(s). In order to form such a layer or layers, a monolayer or multi-layers may be formed by vapor deposition, sputtering, plasma CVD or the like of the high or low refractive index inorganic material(s) or the metal material(s) or by applying a resin composition containing the high or low refractive index inorganic material(s) or the metal material(s).

EXAMPLES

The invention is described in detail using the examples and comparative examples below, but it will be understood that the examples are not intended to limit the scope of the invention. The evaluation methods below were used for the invention.

(1) Total Light Transmittance

According to JIS K 7105, a turbidimeter (NDH 2000, manufactured by Nippon Denshoku Industries Co., Ltd.) was used to determine the total light transmittance of the film.

(2) Glass Transition Temperature

According to JIS K 7121, a differential scanning calorimeter (DSC 6200, manufactured by Seiko Instruments Inc.) was used. The temperature was raised at a rate of 20° C./minute in the range of 25 to 300° C., and an extrapolated glass transition initiation temperature was obtained from the DSC curve and defined as the glass transition temperature.

(3) Adhesion

The test method according to Section 8.5.1 of JIS K 5400 is used to determine the adhesion between the hard coating layer and the base film in the hard-coated film.

More specifically, using a cutter guide with a slit space of 2 mm, cuts in a grid pattern of 100 squares are made from the surface of the hard coating layer so as to reach the base film through the hard coating layer. A pressure-sensitive adhesive cellophane tape (No. 405, 24 mm in width, manufactured by Nichiban Co., Ltd.) is then attached to the cut surface and completely bonded by rubbing with an eraser. The pressure-sensitive adhesive cellophane tape is then perpendicularly peeled from the surface of the hard coating layer of the hard-coated film, and the number of the squares stripped from the hard coating layer side of the hard-coated film is determined by visual counting. The adhesion between the hard coating layer and the base film is calculated using the formula below. Partially stripped squares are also counted as being stripped.

Adhesion (%) =(1−the number of stripped squares/ 100)×100

(4) Resistance to Humidity and Heat

Hard-coated film was allowed to stand under a circumstance controlled at 60° C. and 95RH % for 500 hours in a high-temperature, high-humidity vessel and then removed and allowed to stand at room temperature for 12 hours.

Thereafter, the adhesion between the hard coating layer and the base film was determined using the method of the above item (3) and ranked according to the following criteria.
⊙⊙: 100%
○: at least 96% and less than 100%
▲: at least 80% and less than 96%
×: less than 80%

(5) Improvement Against Interference Fringes (Rainbow Reflections)

Hard-coated film was cut into a sample film with an area of 10 cm (in the film width direction) by 15 cm (in the film length direction). A glossy black tape (Vinyl Tape No. 21, black, manufactured by NITTO DENKO CORPORATION) was bonded to the side opposite to the hard coating layer side of the resulting sample film. The sample film with its hard coating surface facing upward was observed under a three-wavelength light source with daylight white color (National Palook FL 15EX-N 15W) in a positional relation where the reflection visually observed from obliquely above was most intense (with a distance of 40 to 60 cm from the light source at an angle of 15 to 45°).

The results of the visual observation are ranked according to the criteria below. The observation is performed by five members familiar with this evaluation, and the most frequently selected rank is used for evaluation. If the numbers of the members selecting two ranks, respectively, are the same, the median of the corresponding three ranks is employed, for example, as follows. When ranks ⊙⊙ and ○ are each selected by two members and rank ▲ is selected by one member, rank ○ is employed. When rank ⊙⊙ is selected by one member, and ranks ○ and ▲ are each selected by two members, rank ○ is employed. When ranks ⊙⊙ and ▲ are each selected by two members and rank ○ is selected by one member, rank ○ is employed.

⊙⊙: No rainbow reflection is observed at any angle.
○: Rainbow reflection is slightly observed only at a certain angle.
▲: Rainbow reflection is slightly observed.
×: Rainbow reflection is clearly observed.

Polymerization for Polyester Resin

To a stainless steel autoclave equipped with a stirrer, a thermometer and a partial reflux condenser were added 186 parts by weight of dimethyl terephthalate, 186 parts by weight of dimethyl isophthalate, 23.7 parts by weight of dimethyl 5-sodium sulfoisophthalate, 137 parts by weight of neopentyl glycol, 191 parts by weight of ethylene glycol, and 0.5 parts by weight of tetra-n-butyl titanate and subjected to transesterification at temperatures from 160° C. to 220° C. for 4 hours. The reaction system was then heated to 255° C., gradually decompressed and then allowed to react under a reduced pressure of 29 Pa for one hour and 30 minutes to give a copolyester resin (named A-1). The resulting copolyester resin was light yellow and transparent.

Polyester resins with different compositions (named A-2, A-3 and A-4, respectively) were obtained using the same process. The compositions determined by NMR and weight average molecular weights of these copolyester resins, and the evaluation results are shown in Table 1.

TABLE 1

| | | Compositions of Copolymers (% by mole) | | | |
|---|---|---|---|---|---|
| | | A-1 | A-2 | A-3 | A-4 |
| Dicarboxylic Acid Components | Terephthalic Acid | 80 | 47 | 85 | 85 |
| | Adipic Acid | — | — | 10 | — |
| | Isophthalic Acid | 15 | 47 | — | 6 |
| | 5-Sodium Sulfoisophthalic Acid | 5 | 2.5 | 5 | 9 |
| Glycol Components | Ethylene Glycol | 85 | 70 | 70 | 85 |
| | Neopentyl Glycol | 15 | — | — | 15 |
| | 1,4-Butanediol | — | — | 30 | — |
| | Ethylene Oxide Adduct of Bisphenol A | — | 30 | — | — |
| Physical Properties | Weight Average Molecular Weight | 55000 | 53000 | 60000 | 8000 |
| | Glass Transition Temperature (° C.) | 65 | 75 | 45 | 63 |

Example 1

(1) Preparation of Aqueous Dispersions of Polyesters

To a reactor equipped with a stirrer, a thermometer and a reflux condenser were added 20 parts by weight of the polyester resin (A-1) and 15 parts by weight of ethylene glycol monobutyl ether and heated and stirred at 100° C. until the resin was dissolved. After the resin was completely dissolved, 65 parts by weight of water was gradually added to the polyester solution with stirring. After the addition, the solution was cooled to room temperature with stirring to form an aqueous milky white dispersion (named B-1) of the polyester with a solids content of 20% by weight. Similarly, aqueous dispersions named (B-2) to (B-4), respectively, were prepared using the polyester resins (A-2) to (A-4), respectively, in place of the polyester resin (A-1).

(2) Preparation of Coating Liquid 40 parts by weight of the resulting aqueous dispersion (B-1) of the polyester, 18 parts by weight of a 44% by weight hydroxybis(lactato)titanium solution (TC310, manufactured by Matsumoto Chemical Industry Co., Ltd.), 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co., Ltd.) were each added to the mixture to form a coating liquid (hereinafter referred to as coating liquid (C-1)).

(3) Preparation of Readily-Adhesive Polyester Film Having Coating Layer

PET resin pellets having an intrinsic viscosity of 0.62 dl/g and being substantially free of particles were provided as a raw polymer material of film and dried under a reduced pressure of 133 Pa at 135° C. for 6 hours. The pellets were then fed to a twin-screw extruder and melted and extruded at about 280° C. into a sheet, which was rapidly allowed to cool and solidify by contacting on a rotary cooling metal roll with its surface temperature maintained at 20° C. according to a static electricity impression method to give an unstretched PET sheet with a thickness of 1400 µm.

The unstretched PET sheet was heated to 100° C. with a series of heated rolls and an infrared heater and then stretched 3.5 times in the longitudinal direction with a series of rolls with different peripheral speeds to give a uniaxially-stretched PET film.

The coating liquid (C-1) was then applied to one side of the PET film by a reverse roll method so as to provide a dry coating amount of 0.5 g/m$^2$ and then dried at 80° C. for 20 seconds. After the drying, the film was subsequently stretched 4.0 times in the width direction at 120° C. by using tenter and heated at 230° C. for 0.5 seconds with its length in the width direction fixed and then relaxed 3% in the width direction at 230° C. for 10 seconds, resulting in a 100 µm-thick biaxially-stretched PET film having the coating layer on one side.

(4) Preparation of Hard-Coated Film

A solution prepared by adding 5 parts by weight of methyl ethyl ketone to 5 parts by weight of a hard coating agent (Seikabeam EXF01 (B), with a solids content of 100% by weight, manufactured by Dainichiseika Color & Chemicals Mfg. Co., Ltd.) was applied to the coating surface of the resulting readily-adhesive polyester film with a wire bar No. 8 and dried at 70° C. for 1 minute so that the solvent was removed. Ultraviolet light was irradiated by a high pressure mercury lamp to the surface of the hard coating layer under the conditions of an irradiation energy of 200 mJ/cm$^2$ and a radiation distance of 15 cm, while the film with the hard coating layer is fed at a feed rate of 5 m/minute, so that a hard-coated film with a 3 µm-thick hard coating layer was obtained. The evaluation results are shown in Table 2.

Example 2

48 parts by weight of the aqueous dispersion (B-2) of the polyester, 15 parts by weight of a 44% by weight hydroxybis(lactato) titanium solution (TC310, manufactured by Matsumoto Chemical Industry Co., Ltd.), 150 parts by weight of water, and 100 parts by weight of isopropyl alcohol were mixed, and 1% by (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-2)). A biaxially-stretched PET film having a coating layer on one side and a hard-coated film were obtained using the coating liquid and the process of Example 1. The evaluation results are shown in Table 2.

Example 3

12 parts by weight of the aqueous dispersion (B-3) of the polyester, 17 parts by weight of an 80% by weight diisopropoxybis(triethanolaminato)titanium solution (TC400, manufactured by Matsumoto Chemical Industry Co., Ltd.), 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-3)). A biaxially-stretched PET film having a coating layer on one side and a hard-coated film were obtained using the coating liquid and the process of Example 1. The evaluation results are shown in Table 2.

Example 4

24 parts by weight of the aqueous dispersion (B-4) of the polyester, 11 parts by weight of diisopropoxybis(acetylacetonato) titanium, 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-4)). A biaxially-stretched PET film having a coating layer on one side and a hard-coated film were obtained using the coating liquid and the process of Example 1. The evaluation results are shown in Table 2.

Example 5

32 parts by weight of the aqueous dispersion (B-4) of the polyester, 10 parts by weight of zirconium acetate, 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co , Ltd.) were each added to the mixture to form a coating liquid (hereinafter referred to as coating liquid (C-5)). A biaxially-stretched PET film having a coating layer on one side and a hard-coated film were obtained using the coating liquid and the process of Example 1. The evaluation results are shown in Table 2.

Comparative Example 1

80 parts by weight of the aqueous dispersion (B-1) of the polyester, 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-6)). A biaxially-stretched PET film having a coating layer on one side and a hard-coated film were obtained using the coating liquid and the process of Example 1. The evaluation results are shown in Table 2.

Comparative Example 2

64 parts by weight of the aqueous dispersion (B-1) of the polyester, 10 parts by weight of a self cross-linkable polyurethane resin having a blocked isocyanate group (Elastron H-3, manufactured by Dai-ichi Kogyo Seiyaku Co., Ltd.), and 1 part by weight of a catalyst for Elastron (Cat64, manufactured by Dai-ichi Kogyo Seiyaku Co., Ltd.) were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-7)). A biaxially-stretched PET film having a coating layer on one side and a hard-coated film were obtained using the coating liquid and the process of Example 1. The evaluation results are shown in Table 2.

Comparative Example 3

40 parts by weight of a 44% by weight hydroxybis(lactato) titanium solution (TC310, manufactured by Matsumoto Chemical Industry Co., Ltd.), 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-8)). A biaxially-stretched PET film having a coating layer on one side and a hard-coated film were obtained using the coating liquid and the process of Example 1. The evaluation results are shown in Table 2.

Comparative Example 4

32 parts by weight of the aqueous dispersion (B-2) of the polyester, 5 parts by weight of a self cross-linkable polyurethane resin having a blocked isocyanate group (Elastron H-3, manufactured by Dai-ichi Kogyo Seiyaku Co., Ltd.), 0.5 parts by weight of a catalyst for Elastron (Cat64, manufactured by Dai-ichi Kogyo Seiyaku Co., Ltd.), and 64 parts by weight of an aqueous 10% by weight niobium oxide sol solution (SAM-0, manufactured by Taki Chemical Co., Ltd.) were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-9)). A biaxially-stretched PET film having a coating layer on one side and a hard-coated film were obtained using the coating liquid and the process of Example 1. The evaluation results are shown in Table 2.

Comparative Example 5

80 parts by weight of an emulsion of an acrylic resin (methyl methacrylate/ethyl acrylate/acrylic acid/N-methylolacrylamide=60/40/2/4 in weight ratio) with a solids content of 20% by weight, 3.2 parts by weight of di-n-butoxybis (triethanolaminato)titanium, 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-10)). A biaxially-stretched PET film having a coating layer on one side and a hard-coated film were obtained using the coating liquid and the process of Example 1. The evaluation results are shown in Table 2.

Comparative Example 6

Forty-eight parts by weight of an emulsion of an acrylic resin (methyl methacrylate/ethyl acrylate/acrylic acid/N-methylolacrylamide=25/75/4/2 in weight ratio) with a solids content of 20% by weight, 6.4 parts by weight of an aqueous titanium-modified resin (Orgatix WS680, manufactured by Matsumoto Chemical Industry Co., Ltd.), 150 parts by weight of water, and 100 parts by weight of isopropyl alcohol were mixed, and 1% by weight (based on the amount of a coating liquid) of an anionic surfactant (Neopelex No. 6F powder, manufactured by Kao Corporation) and 2% by weight (in terms of silica content based on the amount of the resin solids) of an aqueous dispersion of colloidal silica fine particles (Cataloid SI80P, with an average particle size of 80 nm, manufactured by Catalysts & Chemicals Industries Co, Ltd.) were each added to the mixture to form a coating liquid (hereinafter referred to as coating liquid (C-11)). A biaxially-stretched PET film having a coating layer on one side and a hard-coated film were obtained using the coating liquid and the process of Example 1. The evaluation results are shown in Table 2.

Comparative Example 7

An uncoated biaxially-stretched PET film was obtained using the process of Example 1 except that no readily-adhesive-layer-forming coating liquid was used. A hard coating layer was formed on one side of the uncoated film using the process of Example 1 so that a hard-coated film was prepared. The evaluation results are shown in Table 2.

Comparative Example 8

10 parts by weight of titanium oxide ultra-fine particles (TTO-S-1, manufactured by Ishihara Sangyo Kaisha, Ltd.) with particle sizes (width/length) of 0.01 to 0.02 μm/0.05 to 0.1 μm observed with an electron microscope was mixed with 90 parts by weight of water and dispersed at 5000 rpm for 30 minutes in a dispersing machine (AUTO CELL MASTER CM-200) so that an aqueous dispersion of the titanium oxide particles at a concentration of 10% by weight (named aqueous dispersion A) was prepared.

Thirty parts by weight of the aqueous dispersion (B-4) of the polyester, 150 parts by weight of water, and 100 parts by weight of isopropyl alcohol were then mixed, and 1% by weight (based on the amount of a coating liquid) of an anionic surfactant (Neopelex No. 6F powder, manufactured by Kao Corporation) was added to the mixture to form an aqueous dispersion of the polyester (named aqueous dispersion B). Thirty parts by weight of the aqueous dispersion A of the titanium oxide particles prepared as described above was added to the aqueous dispersion B of the polyester to form a coating liquid. In the coating liquid, however, the titanium oxide fine particles were precipitated in the form of gel, and thus coating the base film was stopped.

TABLE 2

| | Components of Resin Composition for Coating Layer | | | | Characteristic Values | | | |
|---|---|---|---|---|---|---|---|---|
| | Resin A | Additional Resin | Compound B | Component Ratio (A)/(B) | Total Light Transmittance (%) | Adhesion (%) | Resistance to Humidity and Heat | Interference Fringe |
| Example 1 | A-1 | — | Hydroxybis(lactato)titanium | 50.3/49.7 | 90 | 100 | ⊚ | ⊚ |
| Example 2 | A-2 | — | Hydroxybis(lactato)titanium | 59.3/40.7 | 89 | 100 | ⊚ | ⊚ |
| Example 3 | A-3 | — | Diisopropoxybis(triethanolaminato)titanium | 15.0/85.0 | 90 | 100 | ⊚ | ⊚ |
| Example 4 | A-4 | — | Diisopropoxybis(acetylacetonato)titanium | 30.4/69.6 | 91 | 100 | ⊚ | ⊚ |
| Example 5 | A-4 | — | Zirconium Acetate | 39.0/61.0 | 90 | 100 | ⊚ | ⊚ |
| Comparative Example 1 | A-1 | — | — | — | 90 | 90 | ▲ | X |
| Comparative Example 2 | A-1 | Crosslinkable Polyurethane | — | — | 91 | 100 | ○ | X |
| Comparative Example 3 | — | — | Hydroxybis(lactato)titanium | — | 83 | 20 | — | ▲ |
| Comparative Example 4 | A-2 | Crosslinkable Polyurethane | — | — | 89 | 80 | X | ○ |
| Comparative Example 5 | — | Acrylic Resin | Di-n-butoxybis(triethanolaminato)titanium | — | 90 | 100 | ○ | X |
| Comparative Example 6 | — | Titanium-Modified Acrylic Resin | — | — | 90 | 100 | ○ | X |
| Comparative Example 7 | — | — | — | — | 92 | 0 | — | X |
| Comparative Example 8 | A-4 | — | — | — | — | — | — | — |

INDUSTRIAL APPLICABILITY

When a hard coating layer is laminated on the readily-adhesive layer of the optical readily-adhesive polyester film of the invention, the film of the invention demonstrates excellent anti-reflective properties to suppress the reflection of external light, glare, rainbow reflections, and the like and exhibits excellent adhesion to the hard coating layer and exhibits excellent adhesion at high temperatures and high humidities (resistance to humidity and heat). Thus, the film of the invention is useful as a base material film for antireflection films which are attached to the front side of a display screen of a tough panel, a liquid crystal display (LCD), a cathode-ray-tube (CRT) for a television set or computer, a plasma display (PDP), a decoration, or the like to impart antireflection properties such that the reflection of external light, glare, rainbow reflections, and the like can be suppressed. Additionally, the film of the invention exhibits excellent adhesion between the readily-adhesive layer and the layer placed thereon and exhibits excellent adhesion at high temperatures and high humidities (resistance to humidity and heat). Thus, the layer placed on the readily-adhesive layer may be not only the hard coating layer for optical applications but also any other layer comprising any of a wide variety of materials, such as a photosensitive layer, a diazo sensitized layer, a mat layer, an ink layer, an adhesive layer, a thermoset resin layer, a UV cure resin layer, a vapor-deposited layer of metal or inorganic oxide.

The invention claimed is:

1. A readily-adhesive polyester film for optical applications, comprising:
a biaxially-stretched polyester film; and
a coating layer that is stacked on at least one side of the polyester film and produced by applying, to at least one side of the polyester film, an aqueous coating liquid containing a resin composition comprising (A) an aqueous polyester resin and (B) at least one compound selected from the group consisting of a water-soluble titanium chelate compound and a water-soluble titanium acylate compound as main components, the mixing ratio (A)/(B) being from 10/90 to 59.3/40.7 by weight; drying the coating; and then stretching the coating in at least one direction.

2. The readily-adhesive polyester film for optical applications according to claim 1 having a total light transmittance of at least 85%.

3. The readily-adhesive polyester film for optical applications according to claim 1 or 2, wherein the aqueous polyester resin (A) is a copolyester resin containing 1 to 10% by mole of a metal sulfonate group-containing aromatic dicarboxylic acid component based on the total amount of all the dicarboxylic acid components of the polyester.

4. The readily-adhesive polyester film for optical applications of claim 1, wherein the water-soluble titanium chelate compound or the water-soluble titanium acylate compound is at least one compound selected from the group consisting of isopropoxy(2-ethyl-1,3-hexanediolato)titanium, diisopropoxybis(triethanolaminato)titanium, di-n-butoxybis(triethanolaminato)titanium, hydroxybis(lactato)titanium, dissopropoxybis(triethanolaminato)titanium, hydroxybis(lactato)titanium, ammonium salt of hydroxybis(lactato)titanium, and titanium peroxycitric acid ammonium and oxotitaniumbis(monoammonium oxalate).

5. A readily-adhesive polyester film for optical applications, comprising:
a biaxially-stretched polyester film; and
a coating layer that is stacked on at least one side of the polyester film and produced by applying, to at least one side of the polyester film, an aqueous coating liquid containing a resin composition comprising (A) an aqueous polyester resin and (B) at least one compound selected from the group consisting of a water-soluble titanium chelate compound, a water-soluble titanium acylate compound, a water-soluble zirconium chelate compound and a water-soluble zirconium acylate compound as main components, the mixing ratio (A)/(B) being from 10/90 to 59.3/40.7 by weight; drying the coating; and then stretching the coating in at least one direction,
wherein the aqueous polyester resin (A) has a glass transition temperature of at least 40° C.

6. The readily-adhesive polyester film for optical applications according to claim 5, wherein the readily-adhesive polyester film has a total light transmittance of at least 85%.

7. The readily-adhesive polyester film for optical applications of claim 5, wherein the water-soluble titanium chelate compound, the water-soluble titanium acylate compound, the water-soluble zirconium chelate compound or the water-soluble zirconium acylate compound is at least one compound selected from the group consisting of isopropoxy(2-ethyl-1,3-hexanediolato)titanium, diisopropoxybis(triethanolaminato)titanium, di-n-butoxy bis(triethanolaminato)titanium, hydroxybis(lactato)titanium, ammonium salt of hydroxy bis(lactato)titanium, titanium peroxy citric acid ammonium, oxotitaniumbis(monoammonium oxalate), zirconium tetraacetylacetonate and zirconium acetate.

8. A laminated polyester film for optical applications, comprising:
a readily-adhesive polyester film for optical applications comprising a biaxially-stretched polyester film; and a coating layer that is stacked on at least one side of the polyester film and produced applying, to at least one side of the polyester film, an aqueous coating liquid containing a resin composition comprising (A) an aqueous polyester resin and (B) at least one compound selected from the group consisting of a water-soluble titanium chelate compound, a water-soluble titanium acylate compound, a water-soluble zirconium chelate compound and a water-soluble zirconium acylate compound as main components, the mixing ratio (A)/(B) being from 10/90 to 59.3/40.7 by weight; drying the coating; and then stretching the coating in at least one direction; and
a hard coating layer that is stacked on the coating layer on at least one side of the readily-adhesive polyester film and comprises an electron beam-cured or ultraviolet light-cured acrylic resin or a heat-cured siloxane resin.

9. The laminated adhesive polyester film for optical applications according to claim 8 having a total light transmittance of at least 85%.

10. The laminated polyester film for optical applications according to claim 8 or 9, wherein the aqueous polyester resin (A) is a copolyester resin containing 1 to 10% by mole of a metal sulfonate group-containing aromatic dicarboxylic acid component based on the total amount of all the dicarboxylic acid components of the polyester.

11. The laminated polyester film for optical applications according to claim 10, wherein the aqueous polyester resin (A) has a glass transition temperature of at least 40° C.

12. The laminated polyester film for optical applications according to claim 8 or 9, wherein the aqueous polyester resin (A) has a glass transition temperature of at least 40° C.

13. A readily-adhesive polyester film for optical applications comprising:
- a biaxially-stretched polyester film; and
- a coating layer that is stacked on at least one side of the polyester film and produced by applying, to at least one side of the polyester film, an aqueous coating liquid containing a resin composition comprising (A) an aqueous polyester resin and (B) at least one compound selected from the group consisting of a water-soluble titanium chelate compound, a water-soluble titanium acylate compound, a water-soluble zirconium chelate compound and a water-soluble zirconium acylate compound as main components, the mixing ratio (A)/(B) being from 10/90 to 59.3/40.7 by weight; drying the coating; and then stretching the coating in at least one direction,
- wherein the aqueous polyester resin (A) is a copolyester resin containing 1 to 10% by mole of a metal sulfonate group-containing aromatic dicarboxylic acid component based on the total amount of all the dicarboxylic acid components of the polyester, and the aqueous polyester resin (A) has a glass transition temperature of at least 40° C.

14. The readily-adhesive polyester film for optical applications according to claim 13, wherein the readily-adhesive polyester film has a total light transmittance of at least 85%.

15. The readily-adhesive polyester film for optical applications according to claim 13, wherein the aqueous coating liquid further comprises a surfactant, a silica particle, an inorganic or heat-resistant polymer particle, an antistatic agent, an ultraviolet absorbing agent, an organic lubricant, an antimicrobe agent, or a photo-oxidation catalyst.

* * * * *